United States Patent
Kang et al.

(10) Patent No.: US 11,485,892 B2
(45) Date of Patent: Nov. 1, 2022

(54) METHOD FOR PRODUCING SILICA AEROGEL BLANKET HAVING HIGH THERMAL INSULATION AND HIGH STRENGTH

(71) Applicant: LG CHEM, LTD., Seoul (KR)

(72) Inventors: Tae Gyeong Kang, Daejeon (KR); Je Kyun Lee, Daejeon (KR); Kyoung Shil Oh, Daejeon (KR); Hyun Woo Jeon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 333 days.

(21) Appl. No.: 16/761,565

(22) PCT Filed: Aug. 29, 2018

(86) PCT No.: PCT/KR2018/009999
§ 371 (c)(1),
(2) Date: May 5, 2020

(87) PCT Pub. No.: WO2019/103287
PCT Pub. Date: May 31, 2019

(65) Prior Publication Data
US 2020/0332168 A1    Oct. 22, 2020

(30) Foreign Application Priority Data

Nov. 21, 2017  (KR) .................. 10-2017-0155223
Aug. 21, 2018  (KR) .................. 10-2018-0097399

(51) Int. Cl.
C09K 5/14       (2006.01)
C01B 33/158    (2006.01)
C04B 14/04     (2006.01)

(52) U.S. Cl.
CPC ............ C09K 5/14 (2013.01); C01B 33/1585 (2013.01); C04B 14/042 (2013.01); C01P 2004/02 (2013.01); C01P 2006/32 (2013.01)

(58) Field of Classification Search
CPC ..... C04B 14/042; C04B 14/043; C04B 53/14; C04B 53/20; C04B 53/22;
(Continued)

(56) References Cited

U.S. PATENT DOCUMENTS 5,789,075 A * 8/1998 Frank ..................... C04B 30/02
                                                     423/325
5,866,027 A    2/1999 Frank et al.
(Continued)

FOREIGN PATENT DOCUMENTS

CN     101010187 A    8/2007
CN     102 010 179 B   5/2013
(Continued)

OTHER PUBLICATIONS

Extended European Search Report for corresponding European Application No. 18 88 1479 dated Dec. 7, 2020, 9 pages.
(Continued)

*Primary Examiner* — Hoa (Holly) Le
(74) *Attorney, Agent, or Firm* — Morgan, Lewis & Bockius LLP

(57) ABSTRACT

Provided is a method for producing a silica aerogel blanket having high thermal insulation and high strength, wherein an acicular metal-silica composite is added to a step of preparing a silica precursor solution during the production of the silica aerogel blanket to produce a silica aerogel blanket having characteristics of high thermal insulation, high strength, high thermal resistance and low dust.

12 Claims, 3 Drawing Sheets

(58) Field of Classification Search
CPC .......... C04B 53/62625; C04B 53/6303; C04B 53/76; C04B 53/5228; C04B 53/5232; C04B 53/5292
See application file for complete search history.

(56) References Cited

U.S. PATENT DOCUMENTS

| | | |
|---|---|---|
| 7,833,916 B2 | 11/2010 | Leeser et al. |
| 2007/0004306 A1 | 1/2007 | Leeser et al. |
| 2008/0229704 A1 | 9/2008 | Augustyniak et al. |
| 2011/0252739 A1 | 10/2011 | Leeser et al. |
| 2014/0057083 A1 | 2/2014 | Imae et al. |
| 2016/0096949 A1 | 4/2016 | Evans et al. |
| 2017/0305749 A1 | 10/2017 | Jeon et al. |
| 2018/0029892 A1 | 2/2018 | Yu et al. |
| 2018/0127278 A1 | 5/2018 | Kim et al. |
| 2018/0134566 A1 | 5/2018 | Kim et al. |
| 2018/0208474 A1 | 7/2018 | Kim et al. |
| 2021/0292176 A1* | 9/2021 | Jeon .................... C01B 33/1585 |

FOREIGN PATENT DOCUMENTS

| | | | |
|---|---|---|---|
| CN | 104446305 | 3/2015 | |
| CN | 105837244 A | 8/2016 | |
| CN | 106431168 | 2/2017 | |
| CN | 107001055 A | 8/2017 | |
| EP | 3202712 A1 | 8/2017 | |
| JP | 10504793 A | 5/1998 | |
| JP | H10-504793 A | 5/1998 | |
| JP | 2007161861 A | 6/2007 | |
| JP | 2008-505261 A | 2/2008 | |
| JP | 2008505261 A | 2/2008 | |
| JP | 2010-525188 A | 7/2010 | |
| JP | 2010525188 A | 7/2010 | |
| JP | 2017-533163 A | 11/2017 | |
| JP | 2017533163 A | 11/2017 | |
| KR | 10-19977005524 | 10/1997 | |
| KR | 10-0710887 | 4/2007 | |
| KR | 10-0710887 B1 * | 4/2007 | |
| KR | 10-20070052269 | 5/2007 | |
| KR | 10-20100053350 | 5/2010 | |
| KR | 10-20100120036 | 11/2010 | |
| KR | 10-20120070948 | 7/2012 | |
| KR | 10-2016-0141671 A | 12/2016 | |
| KR | 20160141671 A | 12/2016 | |
| KR | 2017-0031011 A | 3/2017 | |
| KR | 2017-0068391 A | 6/2017 | |
| KR | 10-20170104914 | 9/2017 | |
| KR | 10-20170104954 | 9/2017 | |
| WO | 2013141189 A1 | 9/2013 | |
| WO | 2017/043721 A1 | 3/2017 | |
| WO | WO-2017155311 A1 * | 9/2017 | .......... B01J 13/0091 |
| WO | WO-2018186546 A1 * | 10/2018 | .......... B01J 13/0091 |

OTHER PUBLICATIONS

Hajar Maleki et al: "An overview on silica aerogels synthesis and different mechanical reinforcing strategies", Journal of Non-Crystalline Solids, vol. 385, Nov. 22, 2013, pp. 55-74.

* cited by examiner

US 11,485,892 B2

METHOD FOR PRODUCING SILICA AEROGEL BLANKET HAVING HIGH THERMAL INSULATION AND HIGH STRENGTH

CROSS-REFERENCE TO RELATED APPLICATIONS

This application is a National Stage Application of International Application No. PCT/KR2018/009999 filed on Aug. 29, 2018, which claims the benefit of Korean Patent Application Nos. 10-2017-0155223, filed on Nov. 21, 2017, and 10-2018-0097399, filed on Aug. 21, 2018, in the Korean Intellectual Property Office, the disclosures of which are incorporated herein in their entirety by reference.

TECHNICAL FIELD

The present invention relates to a method for producing a silica aerogel blanket having high thermal insulation and high strength.

BACKGROUND ART

A silica aerogel blanket is a product having strengthened structure and greatly improved usability by introducing an inorganic fiber into aerogel, and is used in various industrial fields due to very low thermal conductivity thereof.

However, there is a tendency in that the thermal conductivity of the silica aerogel blanket is rapidly increased at a high temperature of about 400° C. or higher, and at an ultra-high temperature of 650° C. or higher, severe shrinkage thereof occurs since the temperature exceeds the melting temperature of silica, which is the main component of the silica aerogel blanket.

Due to such problems, there is a disadvantage in that the silica aerogel blanket can be used only at a temperature of 600° C. or lower. In order to overcome the disadvantage, a method of increasing the overall density of the aerogel blanket by introducing an inorganic additive having a high specific gravity or increasing the density of a fiber used has been used. When the density of the aerogel blanket is increased, severe shrinkage thereof is prevented even at an ultra-high temperature, thereby preventing a rapid increase in thermal conductivity.

When the density of the aerogel blanket is increased through the above-mentioned method, it is possible to slow down the increase in thermal conductivity after heat treatment. However, there is a problem in that thermal conductivity at room temperature before the heat treatment is noticeably increased due to the influence of the inorganic additive and the fiber having a high density.

Therefore, in order to increase the utilization of an aerogel blanket and to broaden the usage range thereof, there is a need for the development of a method capable of increasing the density of the aerogel blanket while minimizing the deterioration of the thermal insulation performance thereof.

PRIOR ART DOCUMENT (Patent Document 1) Korean Patent Application Publication No. 10-2012-0070948 (published on Jul. 2, 2012)

DISCLOSURE OF THE INVENTION

Technical Problem

An aspect of the present invention provides a silica aerogel blanket having excellent thermal insulation performance even after heat treatment.

Another aspect of the present invention provides a silica aerogel blanket having characteristics of high strength, high thermal resistance, and low dust.

Technical Solution

According to an aspect of the present invention, provided is a method for producing a silica aerogel blanket, the method characterized by adding an acicular metal-silica composite to a step of preparing a silica precursor solution during the production of the silica aerogel blanket.

According to another aspect of the present invention, provided is a silica aerogel blanket produced by the above production method.

Advantageous Effects

According to a method for producing a silica aerogel blanket of the present invention, it is possible to produce a silica aerogel blanket having excellent thermal insulation performance since the increase in thermal conductivity is minimized even after heat treatment.

In addition, according to a method for producing a silica aerogel blanket of the present invention, it is possible to produce a silica aerogel blanket having high strength, high thermal resistance, and low dust.

BRIEF DESCRIPTION OF THE DRAWINGS

The following drawings attached herein illustrate preferred embodiments of the present invention by example, and serve to enable technical concepts of the present invention to be further understood together with detailed description of the invention given below, and therefore the present invention should not be limited or interpreted only with matters in such drawings.

DETAILED DESCRIPTION

Figure 1:
FIG. 1 is an optical microscope photograph (×100) of an acicular metal-silica composite used in the present invention.

Hereinafter, the present invention will be described in more detail to facilitate understanding of the present invention. In this case, it will be understood that words or terms used in the specification and claims shall not be interpreted as having the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

In general, silica aerogel is prepared through steps of silica precursor solution preparation-gelation reaction-aging-surface modification-drying. However, since the silica aerogel has very low mechanical strength due to the porous structure thereof, an aerogel composite (silica aerogel blanket) in which aerogel is bonded to a fibrous blanket by being impregnated therewith, the fibrous blanket such as an inorganic fiber or an organic fiber, both of which are conventional heat insulation fibers, has been prepared and used.

However, there is a tendency in that the thermal conductivity of the silica aerogel blanket is rapidly increased at a high temperature of about 400° C. or higher, and at an ultra-high temperature of 650° C. or higher, severe shrinkage thereof occurs since the temperature exceeds the melting temperature of silica, which is the main component of the silica aerogel blanket.

In order to overcome such limitation, typically, there have been attempts to increase the overall density of the aerogel blanket by introducing an inorganic additive having a high specific gravity or increasing the density of a fiber used to reduce radiant energy transmitted, thereby slowing down the increase in thermal conductivity even after heat treatment. However, the attempts created another problem in that thermal conductivity at room temperature before the heat treatment is noticeably increased due to the influence of the inorganic additive and the fiber having a high density.

Therefore, in order to solve the above problem, the present invention provides a silica aerogel blanket having high thermal insulation with excellent thermal insulation performance by minimizing the increase in thermal conductivity even when heat treatment is performed.

In order to achieve the above purpose, a method for producing a silica aerogel blanket according to an embodiment of the present invention is characterized by adding acicular metal-silica composite particles to a step of preparing a silica precursor solution during the production of the silica aerogel blanket.

The acicular metal-silica composite of the present invention is specifically an acicular metal-silica aerogel composite, which has a higher density than typical aerogel, and has a lower thermal conductivity than a typical inorganic metal additive, so that it is possible to minimize the increase in thermal conductivity even after heat treatment.

Specifically, when an inorganic metal powder is used as an additive in the production of an aerogel blanket, the specific gravity thereof is high, so that it is easy to increase the density, and thus it is possible to slow down the increase in thermal conductivity after heat treatment. However, the thermal conductivity of the inorganic metal itself is high, so that the thermal conductivity even before the heat treatment is noticeably increased.

On the other hand, the acicular metal-silica composite used in the present invention has a high density, so that it is possible to slow down the increase in thermal conductivity even after the heat treatment is performed on the silica aerogel blanket, and has a relatively lower thermal conductivity than the inorganic metal powder, so that it is possible to minimize the increase in room temperature thermal conductivity of the silica aerogel blanket.

Meanwhile, the acicular metal-silica composite which can be used in the present invention is prepared by adding a water glass solution to an acid solution, and then adding a solution containing a metal salt thereto to prepare an acicular intermediate, followed by performing a gelation reaction by adding a base catalyst to prepare a metal-silica composite wet gel, and then washing and drying the metal-silica composite wet gel.

In addition, the metal of the acicular metal-silica composite can be Ca, Mg, or a mixture thereof, and when the reactivity with silica is considered, Ca is most preferred.

Specifically, the acicular metal-silica composite used in the present invention has a density of 0.3 to 0.8 g/ml, more specifically 0.4 to 0.5 g/ml. When the acicular metal-silica composite has a density in the above range, it is easy to adjust the density of the silica aerogel blanket to be finally produced.

The density of the silica aerogel blanket of the present invention produced by using the acicular metal-silica composite having a density in the above range is 190 to 265 kg/m$^3$, specifically 190 to 240 kg/m$^3$, more specifically 200 to 240 kg/m$^3$.

When the density of the silica aerogel blanket of the present invention is less than the above range, there can be a problem in that the thermal conductivity of the silica aerogel blanket after heat treatment can be increased. When the density is greater than the above range, the density of the silica aerogel is excessively high, so that there can be a problem in that the room temperature thermal conductivity thereof can be significantly increased.

In addition, the acicular metal-silica composite of the present invention has an aspect ratio of 1:10 to 1:30, specifically 1:10 to 1:20.

In the present invention, the aspect ratio refers to a value of the diameter of a particle to the length of the particle. For non-spherical additives, the aspect ratio is the most basic properties value.

The acicular metal-silica composite of the present invention has an excellent aspect ratio as described above, thereby having a fiber-like form when added. Thus, when the silica aerogel is formed, the acicular metal-silica composite is easily introduced into the inside of the silica aerogel and is strongly adsorbed to a fiber to greatly strengthen the structure of the silica aerogel blanket and to reduce dust, thereby allowing the silica aerogel blanket of high strength and low dust to be produced.

In addition, the acicular metal-silica composite of the present invention has high thermal resistance which is a unique characteristic thereof, so that a shrinkage phenomenon is noticeably reduced when exposed to an ultra-high temperature of 750° C. or higher compared with a case in which other additives are used, thereby having an advantage of improving the thermal resistance.

Meanwhile, when the aspect ratio is less than 1:10, the structure strengthening effect of the acicular type may be reduced. When greater than 1:30, the strength of acicular particles themselves may be reduced, so that there can be a problem in that the acicular particles may not be able to maintain the shape thereof, but instead, may be easily broken during the production of the aerogel blanket.

In the production method of the present invention, the acicular metal-silica composite is added in an appropriate amount, specifically 50 to 200 wt % based on the weight of silica included in the silica precursor solution, more specifically 50 to 170 wt %.

When added in an amount less than the above range, there can be problem in that an excellent thermal conductivity may not be achieved both before and after heat treatment, which is desired by the present invention. When added in an amount greater than the above range, the density of the silica aerogel blanket is excessively increased, so that there may be a problem in that the room temperature thermal conductivity is increased.

In addition, the present invention provides a silica aerogel blanket produced by the method for producing a silica aerogel blanket of the present invention, thereby including an acicular metal-silica composite.

The silica aerogel blanket of the present invention has a room temperature thermal conductivity of 20 mw/mk or less, more specifically 19 mw/mk or less. Since the increase in thermal conductivity after heat treatment is minimized, the silica aerogel blanket has a room temperature thermal conductivity increase rate of 9.5% or less after the heat treatment at 600° C. for 2 hours, specifically 7.5% or less, more specifically 2.5% or less, and has an excellent thermal insulation performance.

Meanwhile, the room temperature thermal conductivity increase rate (%) can be calculated by the following formula: (Room temperature thermal conductivity after heat treatment−Room temperature thermal conductivity before heat treatment)/(Room temperature thermal conductivity before heat treatment)×100.

In addition, the present invention can provide an insulation material including the silica aerogel blanket, and further including a layer impermeable to water and permeable to water vapor. When the additional layer formed on a surface of the silica aerogel blanket is impermeable to water, it is possible to prevent water from penetrating into a facility or equipment to which the insulation material is applied, so that it is possible to prevent the corrosion of the facility or equipment due to the water. When permeable to water vapor, it is possible to allow water vapor to penetrate out of the facility or equipment to which the insulation material is applied so as to prevent the water vapor to be condensed thereinside, so that it is possible to prevent the corrosion due to the water vapor.

More specifically, the layer that is impermeable to water and permeable to water vapor can be a cellulose material.

As such, the silica aerogel blanket produced according to the method for producing a silica aerogel blanket of the present invention can have characteristics of high thermal insulation, high strength, high thermal resistance and low dust, and thus can have higher utilization in various industrial fields.

EXAMPLES

Hereinafter, examples of the present invention will be described in detail so that those skilled in the art can easily carry out the present invention. The present invention may, however, be embodied in many different forms and is not limited to the examples set forth herein.

Preparation Example: Preparation of Acicular Metal-Silica Aerogel Composite 100 ml of sulfuric acid solution having a concentration of 1.0 to 3.0 M was prepared in a reactor, and 100 ml of water glass solution having a concentration of sulfuric acid solution/water glass solution 3 molar ratio was added thereto. After 0.5 hours, 100 ml of calcium chloride ($CaCl_2.2H_2O$) solution having the same concentration as the sulfuric acid solution was slowly added dropwise, stirred at a stirring speed of 100 to 300 rpm and then subjected to a precipitation reaction at a reaction temperature of 60 to 100° C. for 1 to 3 hours. After the precipitation reaction was completed, a base catalyst ($NH_4OH$) was added such that the pH range was adjusted to 7 to 8, and then a gelation reaction was performed to prepare a metal-silica wet gel composite.

Thereafter, in order to remove impurities, the prepared metal-silica wet gel composite was washed with distilled water for 3 to 5 times, subjected to solvent substitution using ethanol, and then was dried at a temperature of 150° C. for 2 hours under atmospheric pressure to adjust the moisture content thereof to within wt % so as to finally prepare acicular metal-silica aerogel composite powder.

Example 1: Preparation of Silica Aerogel Blanket

Tetraethyl orthosilicate (TEOS), water and ethanol were mixed such that the mass ratio of silica:water:ethanol becomes 1:2:16 to prepare 100 ml of silica precursor solution.

To the silica precursor solution, acicular metal-silica aerogel composite powder was added so as to be 150 wt % (7.3 wt % with respect to the silica precursor solution) based on the weight of silica included in the silica precursor solution, and then stirred for 30 minutes.

Thereafter, a catalyst solution prepared by diluting ammonia of 1 vol % with respect to the precursor mixture solution in ethanol of 12 vol % with respect to the precursor mixture solution was added to the silica precursor mixture solution to induce gelation, and then cast on a glass fiber.

After the gelation was completed, aging was performed at a temperature of 25 to 80° C. for 25 to 100 minutes using an ammonia solution of 1 to 10 vol %. After the aging was completed, a hydrophobic reaction was performed for 1 to 24 hours by adding HMDS of 1 to 10 vol % to hydrophobicize the aged sample.

The hydrophobicized silica aerogel wet gel was placed into a supercritical extractor of 7.2 L, and $CO_2$ was injected thereto. Thereafter, the temperature inside the extractor was raised to 60° C. over 1 hour, and supercritical drying was performed at 60° C. and 100 bar to produce a silica aerogel blanket.

Examples 2 to 4

A silica aerogel blanket was produced in the same manner as in Example 1 except that the acicular metal-silica aerogel composite powder was added in an amount described in Table 1 below.

Comparative Example 1

A silica aerogel blanket was produced in the same manner as in Example 1 except that the acicular metal-silica aerogel composite powder was not added.

Comparative Example 2

A silica aerogel blanket was produced in the same manner as in Example 1 except that inorganic metal powder (Kaolinite) was added in an amount described in Table 1 below instead of the acicular metal-silica aerogel composite powder.

Figure 2:
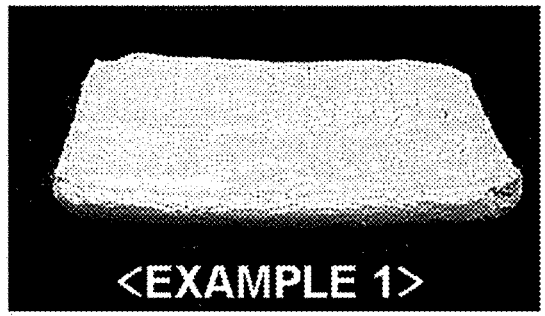
FIG. 2 are photographs of silica aerogel blankets of Examples 1 to 4 of the present invention after an morphological stability experiment.
Figure 2:
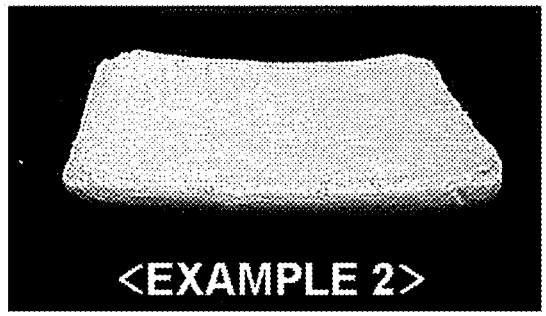
Figure 2:
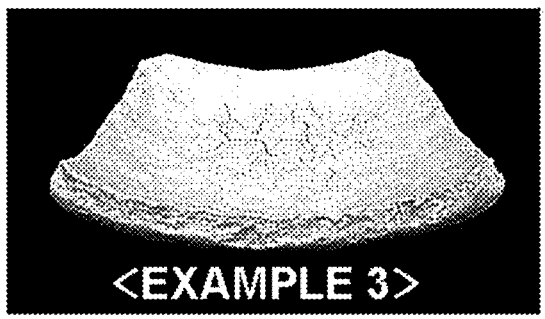
Figure 2:
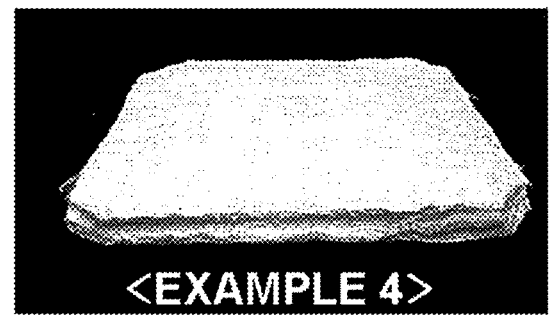

Experimental Example Measurement of Physical Properties of Silica Aerogel Blanket The physical properties of each of the silica aerogel blankets produced in the above Examples and Comparative Examples were measured, and the results are shown in Table 1, FIG. 1 and FIG. 2.

1) Final Density ($Kg/m^3$)

Five aerogel blanket samples each having a size of 10 cm×10 cm were prepared for each of the silica aerogel blankets produced in Examples and Comparative Examples, and the weight thereof was measured. Then, the thickness of the samples was measured using HFM 436 Lambda (thermal conductivity measurement equipment) of NETZSCH Co. The density of the samples was calculated using the measured weight, thickness and size, and the average density of the five samples was determined as the final density.

2) Room Temperature Thermal Conductivity (mW/mK, 25° C.)

A sample having a size of 30 cm×30 cm was prepared for each of the silica aerogel blankets produced in Examples and Comparative Examples, and the room temperature thermal conductivity thereof before heat treatment was measured using HFM 436 Lambda of NETZSCH Co. After the heat treatment was performed at 600° C. for 2 hours, the samples were cooled back to room temperature, and then the room temperature thermal conductivity thereof after the heat treatment was measured.

Room temperature thermal conductivity increase rate (%)=(Room temperature thermal conductivity after heat treatment−Room temperature thermal conductivity before heat treatment)/(Room temperature thermal conductivity before heat treatment)×100

3) Morphological Stability

Each of the silica aerogel blankets produced in Examples and Comparative Examples was heat treated at 750° C. for 1 hour to observe whether the silica aerogel blanket was shrunk or not.

◎: Shrinkage was not invisible to naked eye
○: Slight shrinkage was visible throughout blanket
Δ: Shrinkage was visible throughout blanket
X: Severe shrinkage was visible through blanket.

Meanwhile, in the case of Comparative Example 2 in which the inorganic metal powder (Kaolinite) was added, the increase in room temperature thermal conductivity after the heat treatment was not significant. However, since the room temperature thermal conductivity even before the heat treatment was already high, it can be seen that the thermal insulation performance was not excellent when compared with that of Examples.

(Comparison of Morphological Stability)

As shown in FIG. 2, in the cases of Examples 1 and 4 in which the acicular metal-silica aerogel composite powder was added to the silica precursor solution, it can be confirmed that the morphological stability even after the ultra-high temperature heat treatment was relatively excellent.

Figure 3:
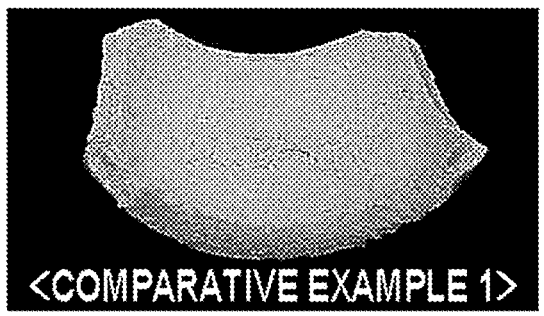
FIG. 3 are photographs of silica aerogel blankets of Comparative Examples 1 and 2 of the present invention after a morphological stability experiment.
Figure 3:
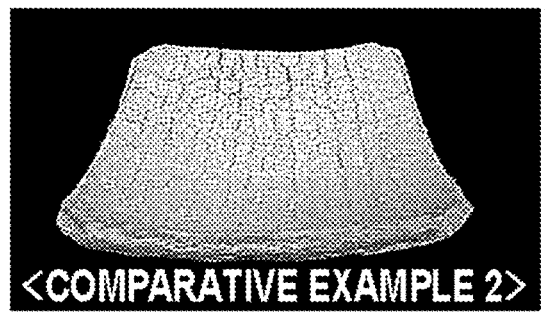

On the other hand, as shown in FIG. 3, in the case of the silica aerogel blanket of Comparative Example 1 in which an additive was not added, it can be confirmed that the entire blanket was severely shrunk after the ultra-high temperature heat treatment of 750° C.

In addition, in the case of the silica aerogel blanket of Comparative Example 2 in which the inorganic metal powder was added to the silica precursor solution, it can be also confirmed that the entire blanket was shrunk after the ultra-high temperature heat treatment.

The foregoing description of the present invention has been presented for purposes of illustration. It will be under-

TABLE 1

| | Additive | Added amount (wt %) | Final density (kg/m$^3$) | Room temperature thermal conductivity (mW/mK, 25° C.) | | Increase rate (%) | Morphological stability |
| --- | --- | --- | --- | --- | --- | --- | --- |
| | | | | Before heat treatment | After heat treatment | | |
| Example 1 | Acicular | 150 | 239 | 18.71 | 19.21 | 2.6 | ◎ |
| Example 2 | metal-silica | 100 | 220 | 18.50 | 19.23 | 3.9 | ○ |
| Example 3 | composite | 50 | 197 | 18.03 | 19.39 | 7.5 | Δ |
| Example 4 | | 170 | 238 | 18.92 | 19.38 | 2.4 | ◎ |
| Comparative Example 1 | — | — | 178 | 17.81 | 19.99 | 12.2 | X |
| Comparative Example 2 | Kaolinite | 150 | 243 | 20.68 | 21.30 | 2.9 | Δ |

(Comparison of Final Density)

It can be confirmed that the density of the silica aerogel blankets of Examples in which the acicular metal-silica composite powder was added was greater than that of the silica aerogel blanket of Comparative Example 1 in which an additive was not added. Referring to the thermal conductivity increase rate after the high temperature heat treatment, it can be seen that the increase in thermal conductivity of Examples having a high density was slowed down when compared with that of Comparative Example 1 having a low density.

(Comparison of Room Temperature Thermal Conductivity)

It can be confirmed that the room temperature thermal conductivity of the silica aerogel blanket of Comparative Example 1 in which an additive was not added was significantly increased after the high temperature heat treatment.

On the other hand, in the case of the silica aerogel blankets of Examples in which the acicular metal-silica composite powder was added to the silica precursor solution, the increase in room temperature thermal conductivity after the heat treatment was slowed down when compared with that of Comparative Example 1.

From the result, it can be seen that the silica aerogel blankets of Examples have high thermal insulation performance.

stood by those skilled in the art that various changes in form and details may be made therein without departing from the spirit and scope of the invention. It is therefore to be understood that the above-described embodiments are illustrative in all aspects and not restrictive.

The invention claimed is:

1. A method for producing a silica aerogel blanket, the method comprising adding an acicular metal-silica composite to a step of preparing a silica precursor solution during the production of the silica aerogel blanket.

2. The method of claim 1, wherein the acicular metal-silica composite is an acicular metal-silica aerogel composite.

3. The method of claim 1, wherein the acicular metal-silica composite has a density of 0.3 to 0.8 g/ml.

4. The method of claim 1, wherein the acicular metal-silica composite has an aspect ratio of 1:10 to 1:30.

5. The method of claim 1, wherein the acicular metal-silica composite is added in an amount of 50 to 200 wt % based on the weight of silica included in the silica precursor solution.

6. The method of claim 1, wherein the metal of the acicular metal-silica composite is Ca, Mg, or a mixture thereof.

7. The method of claim 1, wherein the silica aerogel blanket has a density of 190 to 265 kg/m³.

8. The method of claim 1, wherein the silica aerogel blanket has a room temperature thermal conductivity of 20 mw/mk or less.

9. The method of claim 1, wherein the silica aerogel blanket has a room temperature thermal conductivity increase rate of 9.5% or less after heat treatment at 600° C. for 2 hours.

10. A silica aerogel blanket, comprising an acicular metal-silica composite.

11. The silica aerogel blanket of claim 10, wherein
the silica aerogel blanket has a room temperature thermal conductivity of 20 mw/mk or less, and has a room temperature thermal conductivity increase rate of 9.5% or less after heat treatment at 600° C. for 2 hours.

12. An insulation material, comprising:
the silica aerogel blanket of claim 10; and
a layer impermeable to water and permeable to water vapor.

* * * * *